United States Patent
Schottland et al.

(10) Patent No.: US 6,822,041 B2
(45) Date of Patent: Nov. 23, 2004

(54) NON-STREAKING BLACK COLOR FORMULATIONS FOR POLYCARBONATE-SILOXANE COPOLYMERS AND BLENDS

(75) Inventors: Philippe Schottland, Evansville, IN (US); Brett D. Ermi, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/301,139

(22) Filed: Nov. 21, 2002

(65) Prior Publication Data

US 2004/0102563 A1 May 27, 2004

(51) Int. Cl.⁷ .............................................. C08L 83/00
(52) U.S. Cl. ........................ 524/588; 525/464; 524/537
(58) Field of Search .......................... 525/464; 524/588, 524/537

(56) References Cited

U.S. PATENT DOCUMENTS

| | | | |
|---|---|---|---|
| 4,217,438 A | 8/1980 | Brunelle et al. | ............. 528/202 |
| 5,530,083 A | 6/1996 | Phelps et al. | ............... 528/525 |
| 2003/0130381 A1 * | 7/2003 | Joachimi et al. | ............... 524/88 |

FOREIGN PATENT DOCUMENTS

| EP | 0 595 141 A1 | 5/1994 |
|---|---|---|
| EP | 1 236 758 A1 | 9/2002 |
| JP | 09279044 A | 10/1997 |

OTHER PUBLICATIONS

"Coloring Plastics", ed., Webber, Thomas G. ,Chapter 2 "Pigments for Plastics" Wiley Interscience, NY (1979), p. 38–39.

PCT International Search REport for International Application No. PCT/US 03/33827, International Filing date Oct. 23, 2003.

* cited by examiner

Primary Examiner—Kuo-Liang Peng

(57) ABSTRACT

The present invention relates to a black resin composition comprising:
 a polycarbonate-siloxane copolymer resin, the copolymer comprising polycarbonate units and polyorganosiloxane units wherein the median siloxane domain size is greater than 100 nanometers; and
 a colorant combination comprising at least one organic colorant and at least one inorganic colorant, wherein the combination of the organic and inorganic colorant results in a black molded part with an L* value of less than about 29 and C* value of less than about 1.5 (specular component included) or L* value of less than 8 and C* value of less than about 3 (specular component excluded).

33 Claims, 1 Drawing Sheet

NON-STREAKING BLACK COLOR FORMULATIONS FOR POLYCARBONATE-SILOXANE COPOLYMERS AND BLENDS

FIELD OF THE INVENTION

The present invention relates to non-streaking black color formulations for polycarbonate-siloxane resins and blends containing polycarbonate-siloxane resins. The present invention further relates to resins containing the non-streaking black color formulations.

BACKGROUND OF THE INVENTION

Polycarbonate-siloxane copolymers and blends contain two immiscible phases. When the median siloxane domain size is greater than 100 nanometers, the matrix appears translucent or even opaque depending on part thickness, which creates several colorability problems. When the domains are of irregular shape, size corresponds to the largest dimension of the domain.

Domain sizes are characterized using microscopic techniques such as Scanning Electron Microscopy, Transmission Electron Microscopy. Typically, median size is determined from the distribution of the domain sizes measured according to the SEM or TEM techniques. Since the siloxane domains in these copolymers and blends are of a non-negligible size compared to the wavelengths of visible light, and with the refractive index of these domains being significantly different from the polycarbonate phase, a significant amount of light scattering occurs.

The result is a white "milky" appearance that makes high chroma colors, very low chroma colors and color depth very hard to obtain. In addition, local differences in particle size distribution of the siloxane domains in a molded part usually result in the appearance of visible defects referred to as streaking, flow-lines or knit-lines. The heterogeneous nature of the system also creates opportunities for the colorants to segregate, as they would have more affinity for one domain compared to the other.

As a result of the aforementioned factors, an aesthetically appealing jet-black color has never been achieved in a molded part from a polycarbonate-siloxane copolymers or blends composition with a median siloxane domain size greater than 100 nanometers.

It is well known to those skilled in the art that jet-black colored resins are usually obtained by addition of carbon black. Commercial jet-black color formulations in polycarbonate and polycarbonate blends typically contain between 0.2 and 0.5% of carbon black. However, such formulations cannot be incorporated into polycarbonate-siloxane copolymers and blends having a median siloxane domain size greater than 100 nanometers because streaks (also referred to as knit-lines or flow-lines) appear in the finished article made from the colored resin.

It would be desirable to provide a colorant composition providing low lightness and very low chroma polycarbonate-polysiloxane in copolymers and blends having a median siloxane domain size greater than 100 nanometers. It would further be desirable to provide a colorant composition providing jet black polycarbonate-polysiloxane copolymers and blends having a median siloxane domain size greater than 100 nanometers.

BRIEF DESCRIPTION OF THE INVENTION

Figure 1:
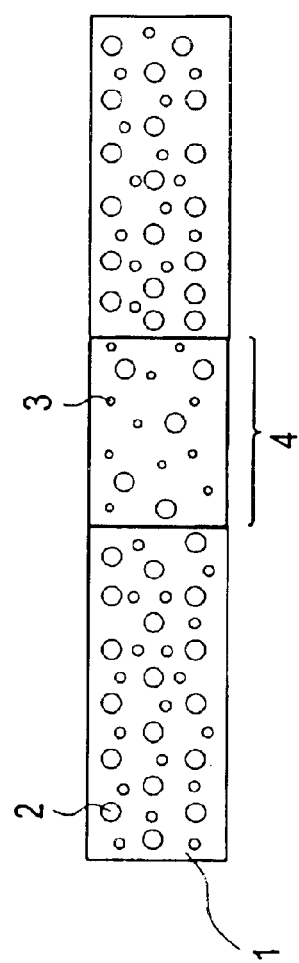
As illustrated in FIG. 1, commercially available, jet-black polycarbonate formulations contain between 0.2 and 0.5% carbon black, such as commercially available jet-black polycarbonate compositions like GE Plastics (USA) LEXAN 141R-701. Black pigments used for coloring plastics are listed for example in "Coloring Plastics", ed. Thomas G. Webber, Wiley Interscience, N.Y. (1979), p.38-39. Knit-lines, or "streaks" appear of a darker color as a result of the different siloxane domain size distribution in the streak. The average siloxane domain size being usually smaller in the knit-line region, less light will be scattered there thus providing more color depth. As a result, the streaks will appear darker.
Figure 2:
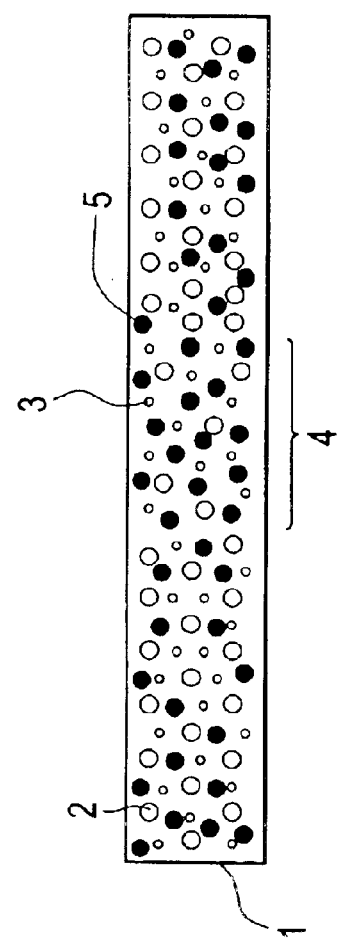
As illustrated in FIG. 2, when formulations of this invention are used in polycarbonate-siloxane copolymers and blends with a median domain size greater than 100 nanometers, molded parts will exhibit a jet-black color without visible knit-lines (streaks).

In one aspect, the present invention relates to a resin composition comprising:
  a polycarbonate-siloxane copolymer resin, the copolymer comprising polycarbonate units and polyorganosiloxane units wherein the median siloxane domain size is greater than 100 nanometers; and
  a colorant combination of at least one organic colorant and at least one inorganic colorant, wherein the combination of the organic and inorganic colorant results in a black molded part with an L* value of less than about 29 and C* value less than about 1.5 (specular component included) or L* value of less than 8 and C* value of less than about 3 (specular component excluded).

In a further aspect, the present invention relates to a method of reducing the visibility of knit lines in a composition comprising a polycarbonate-polysiloxane copolymer, the method comprising incorporating a colorant combination comprising at least one organic colorant and at least one colored inorganic colorant, such that the combination results in a black molded part with an L* value of less than about 29 and C* value of less than about 1.5 and C* value of less than about 1.5 (specular component included) or L* value of less than 8 and C* value of less than about 3 (specular component excluded).

DETAILED DESCRIPTION OF PREFFERED EMBODIMENTS

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.
  "Optional" or "optionally" means that the subsequently described event or circumstance may or may not occur, and that the description includes instances where the event occurs and instances where it does not.
  The term "specular component" corresponds to specular reflection as defined in ASTM E284.

A color is defined by 3 attributes: lightness, chroma and hue. In jet black articles, hue is not very relevant because lightness and chroma are very low. A jet black color is about the lowest chroma and lowest lightness color that can be made. A black color has a much broader definition, i.e. can tolerate higher L* and C* values. A jet black color is a subset of black colors that corresponds to the lowest lightness and chroma.

When standard colorant formulations are used to obtain black polycarbonate-siloxane copolymers or blends where the median siloxane domain size exceeds 100 nm, molded parts exhibit visible knit-lines (also referred to as streaks or flow lines). Jet black colors are even more challenging as standard colorant formulations rarely provide the low lightness and low chroma combination that characterizes a jet black color. In the present invention, however, it was surprisingly found that when the colorant combinations of this invention are used in polycarbonate-siloxane copolymers or blends comprising polycarbonate-siloxane copolymers where the median siloxane domain size exceeds 100 nm, jet-black colors are obtained and knit-lines, streaks or flow-lines are no longer visible. In one aspect, the present invention relates to jet-black formulations with L* less than about 29 and C* less than about 1.5. C* corresponds to a measure of chroma defined by ASTM E284 as the attribute of color used to indicate the degree of departure of the color from a gray of the same lightness.

Colorant combinations according to the present invention contain at least one organic colorant resulting in a dark color and at least one colored inorganic pigment resulting in a dark color. The colored inorganic pigment will disperse throughout the resin matrix giving a dark color, but not dark enough to be considered a jet-black. Beyond a certain total colored inorganic pigment loading the knit lines will disappear.

In one embodiment, the colored inorganic pigment is present in at least 0.5 weight %, based on the weight of the resin; preferably at least about 0.75 weight % based on the weight of the resin; and more preferably at least about 1 weight %, based on the weight of the resin.

The organic colorant present in the colorant combination further improves the color appearance and provides the final jet-black color. In one embodiment, the jet-black appearance can be obtained in the color formulations of this invention with a minimum of 0.3% carbon black and/or combination of organic matter resulting in a black color in addition to the colored inorganic pigments.

Suitable organic colorants include but are not limited to: carbon black (e.g. pigment black 7), organic dyes and pigments such as azo dyes, methine dyes, coumarins, pyrazolones, quinophtalones, quinacridones, perinones, anthraquinones, phtalocyanines, perylene derivatives, anthracene derivatives, indigoid and thioindigoid derivatives, imidazole derivatives, naphtalimide derivatives, xanthenes, thioxanthenes, azine dyes, rhodamines, and all their derivatives.

Suitable colored inorganic pigments include but are not limited to: metal oxides, mixed metal oxides, titanates, aluminates, carbonates, iron oxides, chromium oxides, ultramarines and metal sulfides (including rare-earth sulfides). In a more preferred embodiment of this invention, colored organic pigments include pigments with low lightness and low chroma such as. Pigment Black 28 or Pigment Black 30. Such pigments are for instance available from Shepherd Color Company (Cleveland, Ohio—USA) under the references "Black 1", "Black 376", "Black 462", and "Black 411".

In the present invention, the total amount of inorganic pigments is greater than or equal to about 0.5% and the total amount of organic colorants is greater than or equal to about 0.3%, based on the weight of the resin. In a preferred embodiment, the total loading of colored inorganic pigments is greater than or equal to about 0.75% and the total loading of organic colorant greater than or equal to about 0.5%, based on the weight of the resin. In a most preferred embodiment, the total loading of colored inorganic pigments is greater than or equal to about 1% and the total loading of organic colorant greater than or equal to about 0.8%, based on the weight of the resin.

In one embodiment of the invention, the colorant combination comprises carbon black and at least one inorganic colorant. In a further embodiment of the invention, the colorant combination comprises carbon black, an additional organic colorant and at least one inorganic colorant. In a further embodiment of the invention, the colorant combination comprises carbon black, at least two organic colorants that produce black, and at least one inorganic colorant. Example of organic colorants that produce a black color include but are not limited to mixtures of Solvent Green 3 and Solvent Red 135 or Solvent Green 3, Solvent Violet 13, and Pigment Blue 15:4 as referenced in the Color Index In a further embodiment of the invention, the colorant combination comprises a minimum of about 0.2 to about 0.3 weight % of carbon black, based on the weight of the resin. In another embodiment, the colorant combination comprises a total of two organic colorants at a minimum of about 0.5 weight %, based on the weight of the resin. The color formulations disclosed in this invention are usually compounded with the polycarbonate-siloxane copolymer or blend.

As used herein, the term "polycarbonate" includes polymers having structural units of the formula (I):

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

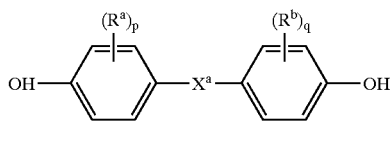

(III)

wherein $R^a$ and $R^b$ each independently represent hydrogen, a halogen atom, or a monovalent hydrocarbon group; p and q are each independently, integers from 0 to 4; and $X^a$ represents one of the groups of formula (IV):

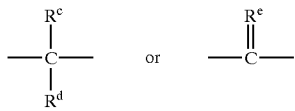

(IV)

wherein $R^c$ and $R^d$ each independently represent a hydrogen atom or a monovalent linear or cyclic hydrocarbon group, and $R^8$ is a divalent hydrocarbon group.

Some illustrative, non-limiting examples of suitable dihydroxy compounds, include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 4,4'-biphenol; and bis(hydroxyaryl) cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid.

Siloxane-polycarbonate block copolymers have been recognized for their low temperature ductility and flame retardancy and may also be utilized as the matrix for incorporating the phosphorescent pigments. These block copolymers can be made by introducing phosgene under interfacial reaction conditions into a mixture of a dihydric phenol, such as BPA, and a hydroxyaryl-terminated polydiorganosiloxane. The polymerization of the reactants can be facilitated by use of a tertiary amine catalyst.

Some of the hydroxyaryl-terminated polydiorganosiloxanes that may be used include phenol-siloxanes of the formula (V)

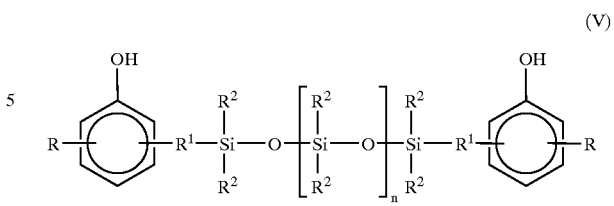

(V)

where each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer greater than or equal to 1, preferably greater than or equal to about 10, more preferably greater than or equal to about 25 and most preferably greater than or equal to about 40. It is also preferred to have n be an integer less then or equal to 1000, preferably less than or equal to 100, more preferably less than or equal to about 75 and most preferably less than or equal to about 60. In one embodiment n is less than or equal to 50. Particularly preferred hydroxyaryl-terminated polydiorganosiloxanes are those where $R^2$ is methyl and R is hydrogen or methoxy and located in the ortho position to the phenolic substituent and where $R^1$ is propyl and located ortho or para to the phenolic substituent.

Some of the radicals included within R in the above formula (V) are hydrogen, halogen radicals, such as bromo, and chloro; alkyl radicals such as methyl, ethyl, and propyl; alkoxy radicals such as methoxy, ethoxy, and propoxy; aryl radicals such as phenyl, chlorophenyl, and tolyl. Radicals included within $R^1$ are, for example, dimethylene, trimethylene and tetramethylene. Radicals included within $R^2$ are, for example, $C_{(1-13)}$ alkyl radicals, haloalkyl radicals such as trifluoropropyl and cyanoalkyl radicals; aryl radicals such as phenyl, chlorophenyl and tolyl. $R^2$ is preferably methyl, or a mixture of methyl and trifluoropropyl, or a mixture of methyl and phenyl.

The siloxane-polycarbonate block copolymers have a weight-average molecular weight (Mw, measured, for example, by Gel Permeation Chromatography, ultracentrifugation, or light scattering) of greater than or equal to about 10,000, preferably greater than or equal to about 20,000. Also preferred is a weight average molecular weight of less than or equal to about 200,000, preferably less than or equal to about 100,000. It is generally desirable to have the polyorganosiloxane units contribute about 0.5 to about 80 wt % of the total weight of the siloxane-polycarbonate copolymer. The chain length of the siloxane blocks corresponds to about 10 to about 100 chemically bound organosiloxane units. They can be prepared, such as described in for example U.S. Pat. No. 5,530,083, incorporated herein by reference in its entirety.

The compositions of the invention may comprise further additives like anti-oxidants, mold release agents, flame retarding agents, or any combination of colorants to achieve the desired aesthetic look under day light and UV stabilizers (e.g. less than about 3 wt. % of the total composition) as is known in the art.

Optionally, particulate inorganic fillers may be added up to about 15 wt. %, preferably no more than 10 wt. % in order to impart desired processing and physical characteristics to the molding composition. Such fillers include but are not limited to glass fibers, glass microspheres, wollastonite, ground quartz and the like of a particulate inorganic filler. Such characteristics include thermal stability, increased density, stiffness, lower creep, and texture. The largest dimension of the particles may vary, and can be less than or equal to about 50 micrometers, with less than or equal to about 15 micrometers preferred, and less than or equal to about 10 micrometers more preferred. Also preferred is minimum dimension of greater than or equal to about 0.1 micrometers, with greater than or equal to about 1 micrometer more preferred, and greater than or equal to about 2 micrometers especially desired.

Resin made from the color compositions disclosed in this invention can be produced according to all known processes for the manufacture of compositions comprising thermoplastic resins. The compositions are preferably prepared by melt mixing the required component followed by extrusion and pelletization of the extrudate. Note that it is also possible—but not preferred—to use the color compositions of this invention in a masterbatch form to color polycarbonate-siloxane copolymers or blends directly at the molding machine provided that the molding machine allows sufficient mixing of the total resin composition.

The polycarbonate-siloxane block copolymer may be blended with other polymers, for example a polycarbonate homopolymer, to form a resin. Blends may be prepared according to mixing techniques well known in the art. In general, the different components of the blend are dry mixed mechanically (blenders/high speed mixers), fed to an extruder where the different resins are melted, and the different phases of the blend will get dispersed. Colorants can be added to the extruder along with the resin components as a dry mixture, added separately as a dry mixture, or added separately downstream. Colorants can also be added during the molding process in the form of a master batch/concentrate.

The resin formulations from the compositions of the invention are, for instance, suitable for making objects that can be used in applications such as business equipment, computers and peripherals, consumer electronics, telecom (cell phones, personal data assistants, wireless devices, enclosures), in the automotive industry (knobs, dashboards and interior/exterior trim), medical devices, and protective helmets.

The advantages of the invention will be realized and attained by means of the elements and combinations particularly pointed out in the claims. It is to be understood that both the foregoing description of the invention and the following examples are exemplary and explanatory only and are not restrictive of the invention, as claimed.

Experimental

Several resin compositions (batches A to E) were prepared in order to compare state-of-the-art formulations to typical formulations of this invention. A polycarbonate-siloxane copolymer with median domain size greater than 100 nm was used as a matrix. The natural appearance of the matrix without added colorant after compounding and molding was an almost opaque white color at 3 mm thickness. The 1.5 mm and 3.2 mm. molded parts from batches A to E were opaque.

Batches (A) through (C) represent state-of-the-art formulations for a jet-black color as used in many polycarbonate and polycarbonate blends currently available on the market. As seen in Table 1, formulations (A) through (C) contain respectively 0.2, 0.35 and 0.5 wt. % of carbon black (here Pigment Black 7 from Monarch). Formulation (D) is similar to (C) but also contains 0.8 wt. % titanium dioxide (Dupont GE01) to avoid the streaks as disclosed in the prior art by Maruvada and co-workers. Batch (E) has been prepared using a color formulation as described in this invention. As seen in Table 1, batch (E) represents a typical formulation of this invention with a total of about 0.63% of organic colorants (0.5% pigment black 7 and 0.13% of pigment blue 15:4) and 0.85% of colored inorganic pigments (0.25% of pigment red 265 and 0.60% of pigment green 50).

All color measurements were performed using a MacBeth ColorEye 7000A integrating sphere spectrophotometer using D65 illuminant, 10 Degree observer. Color data are reported using the CIE1976 LCh color space. When molded objects have a textured surface, color measurements made with specular component excluded are the preferred method.

Molecular weights were determined using WATERS "Millenium" Gel Permeation Chromatography system from Waters Corporation (Milford, Mass.—USA), equipped with 2 mixed bed columns Styragel HR-2 in series for Mw of 10 to 20,000. Note that a Styragel HR-3 column is added to the 2 HR-2 columns when Mw exceeds 20,000.

Color formulations (A) to (F) were compounded with the polycarbonate-siloxane copolymer matrix using a Prism twin-screw extruder and then pelletized. Pellets were then injection-molded in a special tool that has the characteristics of enhancing the visibility of appearance defects due to the presence of cuts, ribs, thickness/texture variations and other intricate geometries in the part. Flat non-textured color chips were also molded at a thickness of 2.54 mm for color analysis. All color measurements were performed using a MacBeth ColorEye 7000A integrating sphere spectrophotometer using D65 illuminant, 10 Degree observer for both Specular Component Included and Specular Component Excluded modes. Color data are reported using the CIE1976 LCh color space.

A summary of the color data for the examples is displayed in Table III. Formulations (E) and (F) exhibited a jet black color as evidenced by an L* value of less than about 29 and C* value of less than about 1.5 and C* value of less than about 1.5 (specular component included) or L* value of less than 8 and C* value of less than about 3 (specular component excluded). Formulation (A) had slightly milky, grayish black appearance instead of the jet-black appearance. Formulation (B) shows some slight improvements over (A) but cannot be considered a jet black. Formulation (D) had a grayish black appearance instead of jet-black due to the presence of titanium dioxide in the color formulation but did not exhibit significant streaking. Formulation (C) is visually very close to a jet black color which is also evidenced by the color data. Formulations (A) to (C) showed visible streaks (knit-lines/flow-lines) that appeared darker than the overall color. No visible streaks, knit-lines or flow-lines were visible in formulation (E) thus illustrating the advantages of the formulations disclosed in the present invention. Furthermore, formulation (E) had a true jet-black color as illustrated by an L* value of 28.46 and C* value of 1.3 (specular component included) or L* value of 6.13 and C* value of 2.12 (specular component excluded)

Batches (F) in Table 1 illustrates another example of a color formulation of this invention with improved jet-black color and absence of knit-lines, streaks or flow-lines.

TABLE I

| | R203 | R107C | R0621 | R312 | R7100 | R665 | R32P | Total organic (%) | Total inorganic (%) |
|---|---|---|---|---|---|---|---|---|---|
| Formula A | 0.2 | | | | | | | 0.2 | |
| Formula B | 0.35 | | | | | | | 0.35 | |
| Formula C | 0.5 | | | | | | | 0.5 | |
| Formula D | 0.5 | 0.8 | | | | | | 0.5 | 0.8 |
| Formula E | 0.5 | | 0.25 | 0.6 | 0.13 | | | 0.63 | 0.85 |
| Formula F | 0.5 | | 0.25 | 0.6 | 0.13 | 0.285 | 0.215 | 1.13 | 0.85 |

TABLE II

| Raw Material ID | Colorant Class | Color Index | CAS # | Trade Name | Supplier |
|---|---|---|---|---|---|
| R203 | Carbon Black | Pigment Black 7 | 1333-86-4 | Monarch 800 | Cabot |
| R107C | Titanium dioxide | Pigment White 6 | 13463-67-7 | Dupont GE01 | Dupont |
| R0621 | Inorganic Pigment | Pigment Red 265 | 12014-93-6 | Neolor Red S | RHODIA |
| R312 | Inorganic Pigment | Pigment Green 50 | 68186-85-6 | Sicopal Green K9610 | BASF |
| R7100 | Organic Pigment | Pigment Blue 15:4 | 147-14-8 | Heliogen Blue K7100 | BASF |
| R665 | Organic Dye | Solvent Red 135 | 20749-68-2 | Macrolex Red EG | BAYER |
| R32P | Organic Dye | Solvent Green 3 | 128-80-3 | Macrolex Green 5B | BAYER |

TABLE III

| | L* (SCI) | C* (SCI) | L* (SCE) | C* (SCE) |
|---|---|---|---|---|
| Formula A | 29.72 | 2.06 | 10.44 | 4.16 |
| Formula B | 28.69 | 1.67 | 7.35 | 3.86 |
| Formula C | 28.16 | 1.41 | 6.73 | 3.76 |
| Formula D | 29.68 | 2.19 | 10.65 | 4.52 |
| Formula E | 28.46 | 1.30 | 6.13 | 2.12 |
| Formula F | 28.78 | 1.47 | 6.94 | 2.43 |

SCI = Spectral Component Included; SCE = Spectral Component Excluded

What is claimed is:

1. A black resin composition comprising
   a polycarbonate-siloxane copolymer resin, the copolymer comprising polycarbonate units and polyorganosiloxane units wherein the median siloxane domain size is greater than 100 nanometers; and
   a colorant combination comprising at least one organic colorant and at least one inorganic colorant, wherein the combination of the organic and inorganic colorant results in an opaque black molded part with an L* value of less than about 29 and C* value of less than about 1.5 (specular component included) or L* value of less than 8 and C* value of less than about 3 (specular component excluded).

2. The composition of claim 1, wherein the resin composition has a jet black appearance.

3. The composition of claim 1 wherein the organic colorant comprises carbon black.

4. The composition of claim 3 wherein the resin composition has a jet black appearance.

5. The resin of claim 1 wherein the composition further comprises a polycarbonate homopolymer resin.

6. The resin of claim 1, wherein the organic colorant is selected from the group consisting of carbon black; azo dyes; methine dyes; coumarins; pyrazolones; quinophtalones; quinacridones; perinones; anthraquinones; phtalocyanines; perylene derivatives; anthracene derivatives; indigoid derivatives; thioindigoid derivatives; imidazole derivatives; naphtalimide derivatives; xanthenes; thioxanthenes; azines; rhodamines; mixtures thereof, and derivatives thereof.

7. The composition of claim 1, wherein the colored inorganic pigment is selected from the group consisting of metal oxides; titanates; aluminates; carbonates; iron oxides; chromium oxides; ultramarines; metal sulfides and mixtures thereof.

8. The composition of claim 1 or 2, wherein the total loading of organic colorants is greater than about 0.3%, based on the weight of the composition and the total loading of colored inorganic pigment is greater than about 0.5%, based on the weight of the composition.

9. The composition of claim 1 or 2, wherein the total loading of organic colorants is greater than about 0.3%, based on the weight of the composition.

10. The composition of claim 1 or 2, wherein the total loading of organic colorants is greater than about 0.5%, based on the weight of the composition.

11. The composition of claim 1 or 2, wherein the total loading of organic colorants is greater than about 0.8%, based on the weight of the composition.

12. The composition of claim 8, wherein the total loading of colored inorganic pigment is greater than about 0.75%, based on the weight of the composition.

13. The composition of claim 8, wherein the total loading of colored inorganic pigment is greater than about 1.0%, based on the weight of the composition.

14. The composition of claim 1 or 2 wherein the total loading of organic colorants is greater than about 0.5%, based on the weight of the composition and the total loading of colored inorganic pigment is greater than about 0.75%, based on the weight of the composition.

15. The composition of claim 1 or 2, wherein the total loading of organic colorants is greater than about 0.8%, based on the weight of the composition and the total loading of colored inorganic pigment is greater than about 1%, based on the weight of the composition.

16. The composition of claim 1, wherein the polycarbonate-siloxane copolymer has a weight average molecular weight in the range of from about 10,000 to about 200,000.

17. The composition of claim 1, wherein the polycarbonate-siloxane copolymer has a weight average molecular weight of from about 10,000 to about 50,000.

18. The composition of claim 1, wherein the polyorganosiloxane units comprise from about 0.5% to about 20 weight % of the total weight of the composition.

19. The composition of claim 1, wherein the polyorganosiloxane units comprise from about 1.5 to about 15 weight % of the total weight of the composition.

20. The composition of claim 1, wherein the polyorganosiloxane units comprise from about 3 to about 5 weight % of the total weight of the composition.

21. The composition of claim 1 further comprising at least one further additive selected from the group consisting of an antioxidant; a mold release agent; a flame retarding agent; a UV stabilizer, an impact modifier and a mixture thereof.

22. The composition of claim 1 or 21, further comprising a particulate inorganic filler.

23. The composition of claim 1, wherein the colorant combination comprises Pigment Black 7, Pigment Red 265, Pigment Green 50 or Pigment Blue 15:4 as designated in the Color Index.

24. The composition of claim 1 wherein the colorant combination comprises Pigment Black 7, Pigment Red 265, Pigment Green 50, Solvent Red 135, Pigment Blue 15:4 or Solvent Green 3 as designated in the Color Index.

25. The composition of claim 1 wherein the colorant combination comprises Pigment Black 7, Pigment Green 50, Pigment Red 265, Solvent Violet 13, Solvent Green 3, or Pigment Blue 15:4 as designated in the Color Index.

26. The composition of claim 1 wherein the colorant combination comprises Pigment Black 7, Pigment Green 50, Pigment Red 265, Solvent Violet 36, Solvent Green 3, or Pigment Blue 15:4 as designated in the Color Index.

27. The composition of claim 1 wherein the inorganic colorant is a black inorganic pigment.

28. The composition of claim 1 wherein the colorant combination comprises Pigment Black 7 and Pigment Black 28.

29. The composition of claim 1 wherein the colorant combination comprises Pigment Black 7 and Pigment Black 30.

30. The composition of claim 28 or 29 wherein the colorant combination further comprises Solvent Red 135 and Solvent Green 3.

31. A method of reducing the visibility of knit lines in a colored composition comprising a polycarbonate-polysiloxane copolymer, the method comprising incorporating a colorant combination comprising at least one organic colorant and at least one colored inorganic colorant, such that the combination results in a an opaque black molded part with an $L^*$ less than about 29 and $C^*$ value of less than about 1.5 and $C^*$ value of less than about 1.5 (specular component included) or $L^*$ value of less than 8 and $C^*$ value of less than about 3 (specular component excluded).

32. The method of claim 31, wherein the composition is jet-black.

33. A black resin composition comprising a polycarbonate-siloxane copolymer resin, the copolymer comprising polycarbonate units and polyorganosiloxane units wherein the median siloxane domain size is greater than 100 nanometers; and a colorant combination comprising carbon black, and at least one inorganic colorant, wherein the carbon black is present in the composition in at least 0.2 weight % based on the weight of the composition and further wherein the combination of the organic and inorganic colorant results in an opaque, black molded part with an $L^*$ value of less than about 29 and $C^*$ value of less than about 1.5 (specular component included) or $L^*$ value of less than 8 and $C^*$ value of less than about 3 (specular component excluded).

* * * * *